US012484623B2

(12) United States Patent
Qi et al.

(10) Patent No.: US 12,484,623 B2
(45) Date of Patent: Dec. 2, 2025

(54) HEATER AND SMOKING DEVICE INCLUDING THE HEATER

(71) Applicant: SHENZHEN FIRST UNION TECHNOLOGY CO., LTD., Shenzhen (CN)

(72) Inventors: Zuqiang Qi, Shenzhen (CN); Jian Wu, Shenzhen (CN); Jiamao Luo, Shenzhen (CN); Baoling Lei, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 622 days.

(21) Appl. No.: 17/846,094

(22) Filed: Jun. 22, 2022

(65) Prior Publication Data

US 2022/0322744 A1  Oct. 13, 2022

Related U.S. Application Data

(63) Continuation of application No. PCT/CN2020/138680, filed on Dec. 23, 2020.

(30) Foreign Application Priority Data

Dec. 23, 2019  (CN) .......................... 201911341109.0

(51) Int. Cl.
*A24F 40/46* (2020.01)
*A24F 40/57* (2020.01)
(Continued)

(52) U.S. Cl.
CPC .............. *A24F 40/46* (2020.01); *A24F 40/57* (2020.01); *H05B 3/0052* (2013.01); *H05B 3/34* (2013.01);
(Continued)

(58) Field of Classification Search
CPC .. H05B 3/0052; H05B 3/34; H05B 2203/003; H05B 2203/005; H05B 2203/016;
(Continued)

(56) References Cited

U.S. PATENT DOCUMENTS 10,721,965 B2 *  7/2020  Lipowicz ................. H05B 3/34
2018/0064170 A1 *  3/2018  Peuchert ................. A24F 40/46

FOREIGN PATENT DOCUMENTS

CN    204335822 U    5/2015
CN    108338415 A    7/2018
(Continued)

OTHER PUBLICATIONS

English machine translation of CN108338415A to Shilong; Jul. 31, 2018; A24F47/00; 21 pages. (Year: 2018).*
(Continued)

*Primary Examiner* — Linda L Gray
(74) *Attorney, Agent, or Firm* — IPro, PLLC; Na Xu

(57) ABSTRACT

The present application discloses a heater and a smoking set including the heater. The heater includes: a base, having an inner surface and an outer surface; an infrared radiation layer, formed on the surface of the base; the infrared radiation layer is configured to generate infrared rays and at least heat an aerosol-forming matrix by radiation; a heating body arranged at the periphery of the base, and used to receive electric power from a power supply to generate heat. The heating body is configured to transfer the heat to heat the infrared radiation layer to generate the infrared rays. According to the present application, the infrared radiation layer is heated up by the heating body so that the infrared radiation layer generates infrared radiation to heat the aerosol-forming matrix, thereby reducing the preheating time of the aerosol-forming matrix and improving the user experience.

20 Claims, 9 Drawing Sheets

(51) Int. Cl.
*H05B 3/00* (2006.01)
*H05B 3/34* (2006.01)

(52) U.S. Cl.
CPC .. *H05B 2203/003* (2013.01); *H05B 2203/005* (2013.01); *H05B 2203/016* (2013.01); *H05B 2203/017* (2013.01); *H05B 2203/032* (2013.01); *H05B 2203/037* (2013.01)

(58) Field of Classification Search
CPC ........ H05B 2203/017; H05B 2203/032; H05B 2203/037
See application file for complete search history.

(56) References Cited

FOREIGN PATENT DOCUMENTS

| | | | | |
|---|---|---|---|---|
| CN | 108338416 A | 7/2018 | | |
| CN | 108338417 A | 7/2018 | | |
| CN | 109846093 A | 6/2019 | | |
| CN | 110384264 A | 10/2019 | | |
| WO | WO-2019229046 A1 * | 12/2019 | ............. | A24B 15/14 |

OTHER PUBLICATIONS

English machine translation of CN 109770433 A to Wang; May 21, 2019; A24F 47/00; 25 pages. (Year: 2021).*

* cited by examiner

HEATER AND SMOKING DEVICE INCLUDING THE HEATER

The present application claims priority to Chinese Patent Application No. 201911341109.0, filed with the Chinese Patent Office on Dec. 23, 2019, titled "HEATER AND SMOKING SET INCLUDING THE HEATER", the entire contents of which are incorporated herein by reference.

TECHNICAL FIELD

Embodiments of the present application relate to the technical field of smoking sets which are noncombustible when being heated, and in particular, relate to a heater and a smoking set including the heater.

BACKGROUND

Smoking articles such as cigarettes and cigars burn tobacco to produce smoke during use. Attempts have been made to provide substitutes for these tobacco-burning articles by producing products that release compounds without burning. Examples of such products are so-called incombustible products which are not incombustible when heated and release compounds by heating instead of burning tobacco.

An existing smoking set which is incombustible when heated at a low temperature mainly generates heat through a heating body, and conducts the heat through a conductor to an aerosol-forming matrix material containing tobacco built in a conductor cavity, so that at least one component in the aerosol-forming matrix material volatilizes to generate aerosol for smoking by users. Such a heating method can raise the temperature rapidly, but it has problems of low heat conduction efficiency, slow preheating of the aerosol-forming matrix material, and difficulty in effectively heating the interior of the matrix material, which results in poor taste of the aerosol and bad user experience. In addition, another kind of smoking set which is incombustible when heated at a low temperature is also available, and it operates by coating a far infrared electrothermal coating and a conductive coating on an outer surface of a base, so that the far infrared electrothermal coating, after being powered on, is heated up to emit far infrared rays to penetrate the base and heat an aerosol-forming matrix material inside the base. As the far infrared rays have strong penetrability, they can penetrate the periphery of aerosol-forming matrix and enter the aerosol-forming matrix so that the aerosol-forming matrix is heated evenly. However, a semiconductor material needs to be chosen for this kind of far infrared electrothermal coating, and thus the range of choice for the far infrared electrothermal coating is small. Moreover, the far infrared electrothermal coating usually has a large resistance, a low thermal efficiency, and a slow heating rate, which leads to problems of a slow preheating speed and to-be-improved user experience.

SUMMARY

A first aspect of the present application discloses a heater for heating an aerosol-forming matrix in a smoking set to generate aerosol for smoking The heater includes: a base, having an inner surface and an outer surface; an infrared radiation layer, formed on the surface of the base; the infrared radiation layer being configured to generate infrared rays and at least heat the aerosol-forming matrix by radiation; a heating body, being arranged at the periphery of the base, and being configured to receive electric power from a power supply to generate heat, and being configured to transfer the heat to the infrared radiation layer, so that the infrared radiation layer is heated up by the heat to generate the infrared rays.

A second aspect of the present application discloses a smoking set. The smoking set includes a housing assembly and the heater according to the first aspect; and the heater is arranged in the housing assembly.

BRIEF DESCRIPTION OF THE DRAWINGS

One or more embodiments are illustrated by pictures in corresponding attached drawings, and this does not constitute limitation on the embodiments. Elements with the same reference numerals in the attached drawings are shown as similar elements, and the pictures in the attached drawings do not constitute scale limitation unless otherwise stated particularly.

DETAILED DESCRIPTION

In order to facilitate the understanding of the present application, the present application will be explained in more detail below with reference to the attached drawings and the detailed description. It shall be noted that, when an element is expressed as "fixed to" another element, it may be directly on another element, or there may be one or more intervening elements therebetween. When an element is expressed as "connected" to another element, it may be directly connected to another element, or there may be one or more intervening elements therebetween. Terms such as "up", "down", "left", "right", "inside", "outside" and other similar expressions used in this specification are for illustrative purposes only.

Unless otherwise defined, all technical and scientific terms used in this specification have the same meanings as commonly understood by those skilled in the art of the present application. In this specification, the terms used in the specification of the present application are only for the purpose of describing specific embodiments, and are not intended to limit the present application. The term "and/or" used in this specification comprises any and all combinations of one or more related items listed.

The main problems of the traditional smoking set which is incombustible when heated at a low temperature is that: the preheating time of the aerosol-forming matrix is relatively long, and the user experience needs to be improved.

The heater and the smoking set including the heater according to the embodiment of the present application reduce the preheating time of the aerosol-forming matrix and improve the user experience by means of heating up the infrared radiation layer generates infrared radiation to heat the aerosol-forming matrix by the heating body. Meanwhile, the selection of the material for the infrared radiation layer is greatly expanded because of heating the infrared radiation layer with the heating body without considering the conductivity of the infrared radiation layer.

First Embodiment

Figure 1:
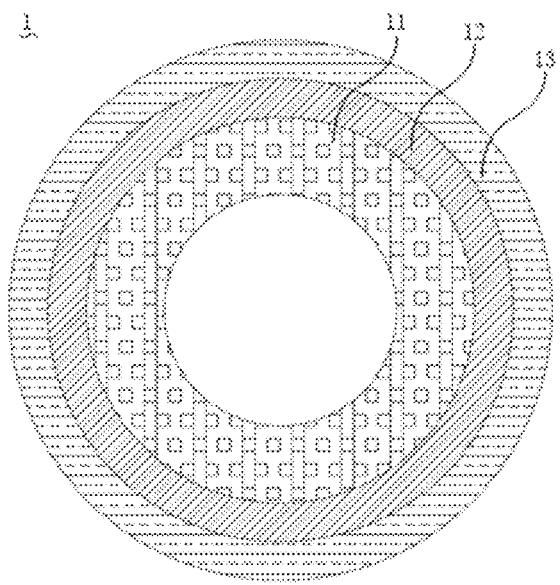
FIG. 1 is a schematic view of a heater according to a first embodiment of the present application.

As shown in FIG. 1, the first embodiment of the present application discloses a heater for heating an aerosol-forming matrix and volatilizing at least one component in the aerosol-forming matrix to form aerosol for smoking by users. The heater 1 includes a base 11, an infrared radiation layer 12 and a heating body 13.

The base 11 is formed with a space for containing the aerosol-forming matrix, and the inner surface of the base 11 forms at least a part of the boundary of the space.

Figure 2:
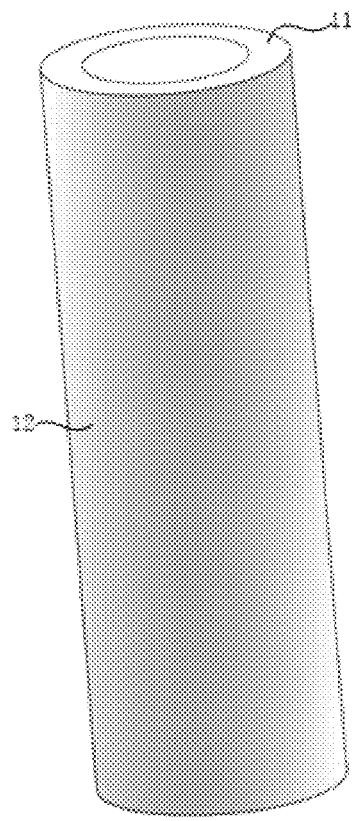
FIG. 2 is a schematic view of an infrared radiation layer formed on a base according to the first embodiment of the present application.

Referring to FIG. 2 for understanding, the base 11 has first and second ends which are opposite to each other, and the base 11 extends in the longitudinal direction between the first and second ends, and the base 11 is hollow inside to form a cavity adapted for accommodating the aerosol-forming matrix. The base 11 may be in cylindrical, prismatic or other columnar shapes. The base 11 is preferably cylindrical, then the cavity is a cylindrical hole penetrating through the middle of the base 11, and the inner diameter of the hole is slightly larger than the outer diameter of an aerosol-forming article or a smoking article, so that it is convenient to place the aerosol-forming article or the smoking article in the cavity to be heated.

The base 11 may be made of materials with high temperature resistance and high infrared transmittance, which include but not limited to the following materials: quartz glass, sapphire, silicon carbide, magnesium fluoride ceramic, yttrium oxide ceramic, magnesia-alumina spinel ceramic, yttrium aluminum garnet single crystal and germanium single crystal or the like. Preferably, the base 11 is made of quartz glass.

The aerosol-forming matrix is a matrix which can release volatile compounds capable of forming the aerosol. This kind of volatile compounds can be released by heating the aerosol-forming matrix. The aerosol-forming matrix may be a solid or a liquid or include solid and liquid components. The aerosol-forming matrix may be adsorbed, coated, impregnated or otherwise loaded on a carrier or support. The aerosol-forming matrix may conveniently be a part of an aerosol-generating article or a smoking article.

The aerosol-forming matrix may include nicotine. The aerosol-forming matrix may include tobacco, for example, a tobacco-containing material containing a volatile compound with a tobacco flavor, and the volatile compound with the tobacco flavor is released from the aerosol-forming matrix when it is heated. A preferred aerosol-forming matrix may include a homogeneous tobacco material, such as deciduous tobacco. The aerosol-forming matrix may include at least one aerosol-forming agent, which may be any suitable and known compound or a mixture of compounds. During use, the compound or the mixture of compounds is conducive to the formation of stable aerosol, and is basically resistant to thermal degradation at the operating temperature of the aerosol-generating system. Suitable aerosol-forming agents are well known in the art and include but are not limited to: polyols such as triethylene glycol, 1,3-butanediol and glycerol; esters of polyols, such as glycerol monoacetate, glycerol diacetate or glycerol triacetate; and fatty acid esters of mono-carboxylic acids, di-carboxylic acids or poly-carboxylic acids, such as dimethyl dodecanedioate and dimethyl tetradecanedioate. The preferred aerosol-forming agent is polyhydric alcohols or a mixture thereof, such as triethylene glycol, 1,3-butanediol and the most preferred glycerine.

Referring to FIG. 2, the infrared radiation layer 12 is formed on the surface of the base 11. The infrared radiation layer 12 may be formed on the outer surface of the base 11 or formed on the inner surface of the base 11. The infrared radiation layer 12 is preferably formed on the outer surface of the base 11.

The infrared radiation layer 12 can generate infrared rays of a certain wavelength after it is heated up by absorbing the heat, and the infrared radiation layer 12 is used for generating the infrared rays to at least heat the aerosol-forming matrix by radiation.

The infrared radiation layer 12 may be made of oxides, carbon materials, carbides, nitrides and other materials with high infrared radiance. The materials are specifically described as follows.

The metal oxides and multicomponent alloy oxides include: ferric oxide, aluminum oxide, chromium oxide, indium oxide, lanthanum oxide, cobaltic oxide, nickel oxide, antimony oxide, antimony pentoxide, titanium dioxide, zirconium dioxide, manganese dioxide, cerium dioxide, copper oxide, zinc oxide, magnesium oxide, calcium oxide, or molybdenum trioxide or the like; or a combination of two or more metal oxides described above; or a ceramic material with a unit cell structure such as spinel, perovskite and olivine.

The emissivity of carbon materials is close to that of a blackbody, and the carbon materials have a higher infrared radiance. The carbon materials includes: graphite, carbon fiber, carbon nanotubes, graphene, or diamond-like carbon thin films or the like.

The carbides include: silicon carbide, which has high emissivity in a large infrared wavelength range (2.3 microns to 25 microns) and is a preferred near-full-band infrared radiation material; in addition, the carbides include tungsten carbide, iron carbide, vanadium carbide, titanium carbide, zirconium carbide, manganese carbide, chromium carbide or niobium carbide or the like, all of which have high infrared emissivity (MeC phase does not have strict stoichiometric composition and chemical formula).

The nitrides include metal nitrides and nonmetal nitrides, wherein the metal nitrides include titanium nitride, titanium carbonitride, aluminum nitride, magnesium nitride, tantalum nitride or vanadium nitride or the like, and the nonmetal nitrides include boron nitride, phosphorus nitride or silicon nitride ($Si_3N_4$) or the like.

Other inorganic nonmetallic materials include: silica, silicate (including phosphosilicate, borosilicate or the like), titanate, aluminate, phosphate, boride, or chalcogenide or the like.

The formation of the infrared radiation layer 12 on the surface of the base 11 will be described hereinafter with reference to the specific preparation process.

EXAMPLE 1-1

Quartz glass is selected as the substrate, and an amorphous carbon film is deposited on the outer wall of the base 11 (quartz glass) as the infrared radiation layer 12. Specifically, the amorphous carbon film is prepared through the pulsed laser deposition (PLD) method by using a high-purity pressed graphite target in a vacuum equipment. The PLD method is a vacuum physical deposition process, which focuses high-power pulsed laser on the target surface to generate high temperature and ablate the surface so that high-temperature and high-pressure plasma is generated, and the plasma is directionally and locally expanded and emitted and deposited on the base to form a thin film. In other examples, radio frequency magnetron sputtering, multi-arc ion source ion plating and other methods may also be adopted. The preparation process is as follows:

A mechanical pump is combined with a molecular pump to vacuumize the vacuum chamber to below $5 \times 10^{-4}$ Pa.

The heating device is turned on to keep the temperature of the base 11 at 100° C. to 450° C.; preferably, the temperature of the base 11 is kept at 300° C.

Argon is introduced, and the flow rate of argon is adjusted to be 20 sccm to 300 sccm using a gas flowmeter.

An intermediate frequency ion source cleaning system or a high voltage mode ion source cleaning system is turned on to perform plasma bombardment on the surface of the base 11, so as to thoroughly clean the surface thereof and improve the adhesion of the film.

The argon flow rate is adjusted, and a laser is turned on (wherein the laser pulse width is 10 ns, the frequency is 1 Hz to 10 Hz, and the energy is 1 mJ to 300 mJ) to bombard the graphite target, and the deposition and film plating process is started, wherein the deposition time is 10 min to 60 min and the deposition thickness is 100 nm to 900 nm as required.

The power supply of the laser is turned off.

EXAMPLE 1-2

A zirconium oxide/titanium oxide composite film is deposited as the infrared radiation layer 12 by performing sputtering on two pairs of targets, i.e., a zirconium target and a titanium target, at the same time by using the intermediate frequency reactive deposition method. The preparation process is as follows:

A cleaned base 11 is placed in a vacuum chamber which is vacuumized to below $5 \times 10^{-4}$ Pa.

A heating device is turned on to keep the temperature of the base 11 at 100° C. to 450° C.; preferably, the temperature of the base 11 is kept at 300° C.; 20 sccm to 300 sccm of argon is introduced as working gas, and 30 sccm to 200 sccm of oxygen is introduced as reactive gas.

A zirconium target intermediate frequency power supply and a titanium target intermediate frequency power supply are turned on at the same time, wherein the power of the zirconium target is 1 to 10 times that of the titanium target, so that the zirconium oxide component deposited by the reaction is close to the titanium oxide component or 1 to 10 times larger than the titanium oxide component.

The deposition time is set according to the film thickness requirement, and the intermediate frequency power supply is turned off when the deposition is finished.

It shall be noted that, it is also possible to deposit the oxide film through reactive sputtering by using a DC pulsed power supply and a multi-arc power supply and introducing argon and proper amount of oxygen as reaction gases. Alternatively, the oxide film may also be directly deposited by using an RF power supply, taking an oxide ceramic target as the sputtering source, and introducing argon as the working gas.

In addition, nitrides and carbides may also be deposited by similar methods. Plating of nitrides may be realized through reactive deposition by using metal and nonmetal (such as silicon, etc.) as targets, and introducing argon and nitrogen as working gases. Alternatively, the nitrides may also be directly deposited by adopting a nitride ceramic target and using an RF power supply. The carbides are prepared through reactive deposition by using metal and nonmetal (such as silicon, etc.) as targets, and introducing argon and carbon-containing organic gases (such as methane, ethane, ethylene, acetylene or propane, etc.), or the amorphous carbon film may also be directly prepared by reactive deposition. The carbides may also be deposited by directly performing sputtering on a carbide ceramic target with the RF power supply.

The heating body 13 is arranged on the periphery of the base 11 for receiving electric power from a power supply to generate heat, and is configured to transfer the heat to the infrared radiation layer 12 so that the infrared radiation layer 12 is heated up by the heat to generate infrared rays.

Figure 3:
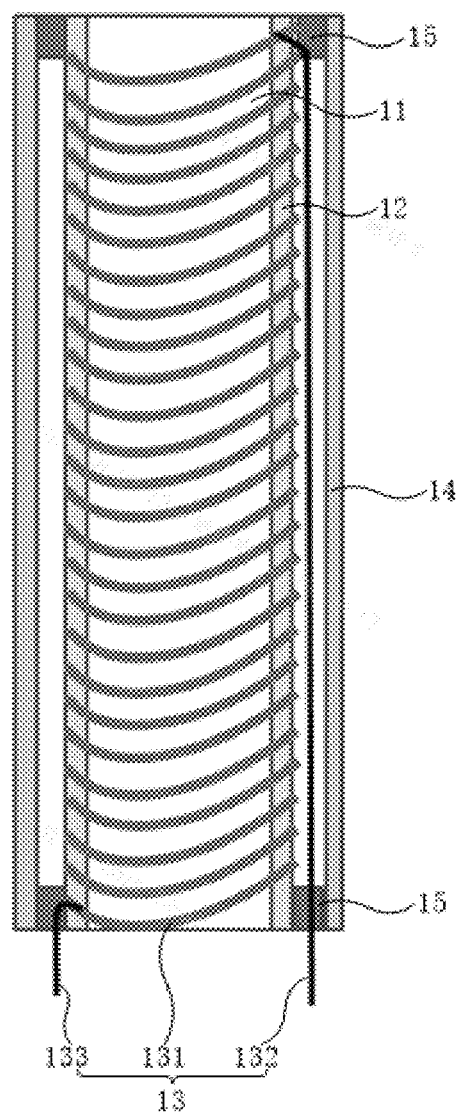
FIG. 3 is a schematic cross-sectional view of a heater with a spiral resistive heating strip according to the first embodiment of the present application.

Referring to FIG. 3, in one example, the heating body 13 includes a resistive heating layer 131 formed on the periphery of the base 11, and a first electrode 132 and a second electrode 133 electrically connected to the resistive heating layer 131. The first electrode 132 and the second electrode 133 are used to feed the electric power of the power supply to the resistive heating layer 131.

In this example, the resistive heating layer 131 is a resistive heating strip spirally surrounding the surface of the base 11, and the resistive heating strip extends along the longitudinal direction of the base 11 at equal pitches. The resistive heating strip with equal pitches can enable the infrared radiation layer 12 to be heated evenly, and ensure the uniformity of the heating speed and fragrance volatilization of the aerosol-forming matrix, and the taste of smoking.

The resistive heating layer 131 may be made of metal materials, carbon materials and semiconductor materials or the like. Specifically, the conductive metal materials include: aluminum, copper, titanium, chromium, silver, iron or nickel or the like; or alloy components of the above metals, such as stainless steel, Fe—Cr—Al alloy, Ni—Cr alloy or Ni—Fe alloy or the like; the carbon materials include: graphite, conductive diamond-like carbon, carbon fiber, carbon nanotubes or grapheme or the like; the semiconductor materials include indium tin oxide, nickel oxide, silicon carbide, aluminum nitride, gallium nitride, doped tin oxide, zinc oxide or doped zinc oxide, such as AZO, GZO, IZO, B-doped, N-doped, P-doped, As-doped, Sb-doped, Mo-doped, La-doped, IA (Li, Na, K)-doped or IB (Au, Ag, Cu)-doped elements or the like.

According to the requirements of heating temperature and power, an appropriate material for the resistive heating layer 131 is selected to form a resistance film with appropriate thickness, and obtain the appropriate resistance range. The resistance value of the resistive heating layer 131 may be 0.1Ω to 10Ω, preferably 0.3Ω to 8Ω, more preferably 0.5Ω to 5Ω, and even more preferably 0.6Ω to 3.5Ω.

In this example, the resistive heating layer 131 is deposited on the infrared radiation layer 12 by physical vapor deposition. The formation of the resistive heating layer 131 on the infrared radiation layer 12 will be described hereinafter with reference to the specific preparation process.

EXAMPLE 2-1

Deposition is performed by using a direct current (DC) power supply, a DC pulsed power supply or an intermediate frequency power supply. The preparation process is as follows:

A titanium metal film is deposited on the outer wall of the base 11 (quartz glass) by using a titanium target and a DC power supply; wherein titanium has good stability, good biocompatibility, food-grade contact safety, relatively high resistivity (as compared to silver, copper, etc.) and better control of membrane resistance.

Since the resistivity of titanium is relatively high ($5.56 \times 10^{-7}$ $\Omega$m), when it is welded or connected with the electrode, point contact exists between the electrode and the titanium metal film, which leads to a large contact resistance. Therefore, it is necessary to deposit a silver film with low resistivity ($1.62 \times 10^{-6}$ $\Omega$m) to reduce the contact resistance.

The base 11 plated with the titanium metal film is taken out and partially covered with metal or high-temperature resistant film material with a place where a contact electrode needs to be plated uncovered, and the base 11 is placed in a vacuum chamber which is then vacuumized to below $5 \times 10^{-4}$ Pa.

The DC power supply for the silver target is turned on to deposit a silver film on the covered area of the base 11.

After the plating of the silver film has been finished, the base 11 is taken out to uncover the metal film or high-temperature resistant film so that the preparation of the resistive heating layer 131 is completed.

Combined with Examples 1-1 and 1-2, the prepared infrared radiation layer 12, the prepared resistive heating layer 131, the prepared first electrode 132 and the prepared second electrode 133 are as follows:

1. Amorphous carbon film+titanium metal film+silver film (contact electrodes). The resistance of the titanium metal film plated with the silver film is 1$\Omega$ to 3$\Omega$, preferably 2$\Omega$. The infrared emissivity of the amorphous carbon film is more than 85%, preferably 93.5%. The preheating time of the aerosol-forming matrix may be shortened from 25 seconds to 20 seconds.

2. Zirconia/titania composite film+titanium metal film+silver film (contact electrodes). The resistance of the titanium metal film plated with the silver film is 0.75$\Omega$ to 3.5$\Omega$, preferably 1.5$\Omega$. The infrared emissivity of the zirconia/titania composite film is more than 80%, preferably 93.5%. The preheating time of the aerosol-forming matrix may be shortened from 25 seconds to 20 seconds.

In this example, the heater 1 further includes an infrared reflecting layer, the infrared reflecting layer is a flexible layer and it may be an aluminum foil. Preferably, an infrared reflecting material such as metal is deposited on the flexible substrate 14 by the physical vapor deposition method, and the flexible substrate 14 covers the periphery of the resistive heating layer 131 to reflect the infrared rays radiated to the outside of the base 11 back to the resistive heating layer 131. The flexible substrate 14 may be made of materials with high infrared reflectivity such as polyetheretherketone or polyimide.

A separator 15 is further arranged between the flexible substrate 14 and the resistive heating layer 131, and a gap is formed between the infrared reflecting layer and the resistive heating layer 131 by the separator 15, thereby reducing the heat loss in the direction away from the aerosol-forming matrix. The separator 15 may be a block, a bump or objects with other shapes, and the number and shape thereof are not limited herein. The separator 15 is made of at least one of polyetheretherketone, zirconia ceramic and alumina ceramic.

Figure 4:
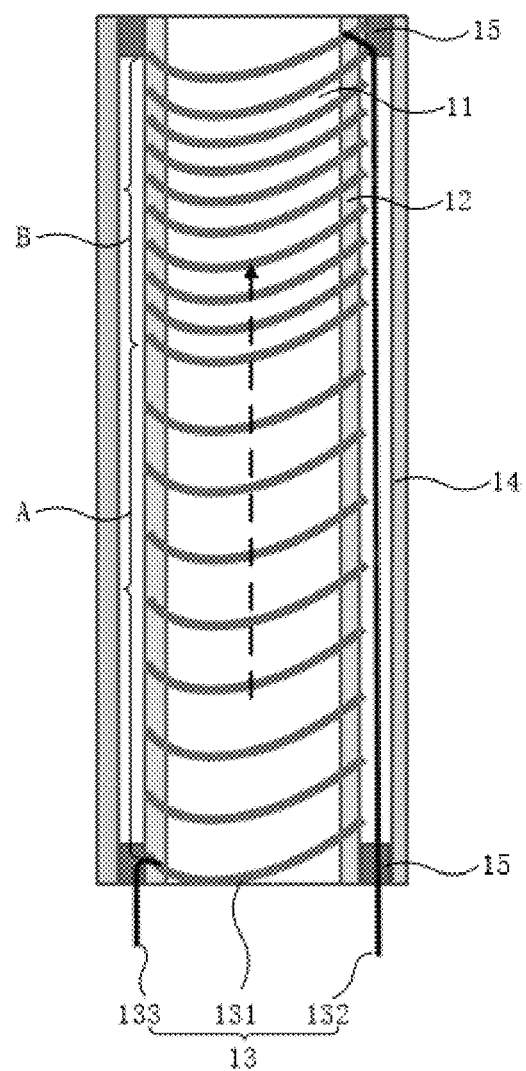
FIG. 4 is another schematic cross-sectional view of the heater with the spiral resistive heating strip according to the first embodiment of the present application.

Referring to FIG. 4, different from the example shown in FIG. 3, the spiral resistive heating strip 131 extends along the longitudinal direction of the base 11 at varying pitches to distribute the heat supplied to the infrared radiation layer 12 as desired. It shall be noted that, extending along the longitudinal direction of the base 11 means extending, as a whole or generally, along the direction, for example as shown by the spiral lines shown in FIG. 3 or FIG. 4. The outer surface of the infrared radiation layer 12 has a first area A and a second area B. The first area A is near the upstream of the moving path of the aerosol (as shown by the dotted arrow in the figure), and the second area B is near the downstream of the moving path of the aerosol. The pitch of the resistive heating strip in the first area A is larger than that of the resistive heating strip in the second area B.

By setting different pitches of the resistive heating strip in different areas of the infrared radiation layer 12, the heating speed of the aerosol-forming matrix in the downstream area can be increased, the effect of rapid smoke discharge can be achieved, and the user experience can be improved.

Figure 5:
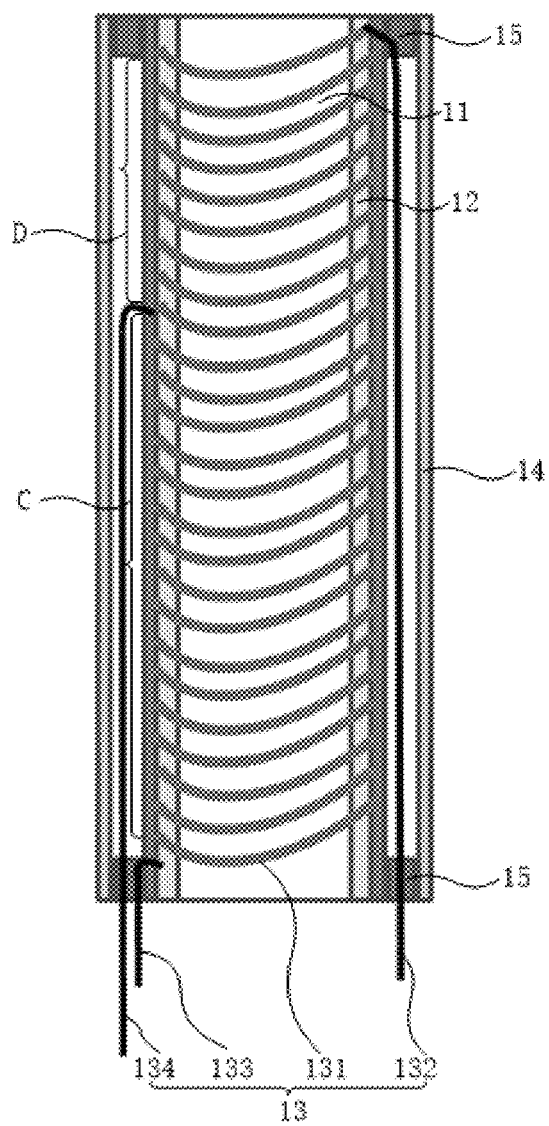
FIG. 5 is a schematic cross-sectional view of a heater for segmented heating according to the first embodiment of the present application.

Referring to FIG. 5, different from the example shown in FIG. 3, the heating body further includes a third electrode 134 electrically connected with the resistive heating layer.

The third electrode 134 is arranged to divide the resistive heating layer 131 into a first part of resistive heating layer C and a second part of resistive heating layer D along the longitudinal direction of the base 11. By independently controlling the electric power fed to the first part of resistive heating layer and/or the second part of resistive heating layer to control heating for different positions of the base 11, segmented heating of the aerosol-forming matrix is realized.

Segmented heating can ensure the uniformity of heating speed and fragrance volatilization of the aerosol-forming matrix, and the taste of smoking.

Further speaking, the length of the first part of resistive heating layer C along the longitudinal direction of the base 11 is larger than that of the second part of resistive heating layer D along the longitudinal direction of the base 11. The first part of resistive heating layer C is near the upstream of the moving path of the aerosol, and the second part of resistive heating layer D is near the downstream of the moving path of the aerosol.

By setting partial resistive heating layers with different lengths in different areas of the infrared radiation layer 12, the heating speed of the aerosol-forming matrix in the downstream area can be increased, the effect of rapid smoke discharge can be achieved, and the user experience can be improved.

It shall be noted that, FIG. 3 to FIG. 5 only show spiral resistive heating strips, and the resistive heating layer 131 may be other patterned conductive tracks.

Figure 6:
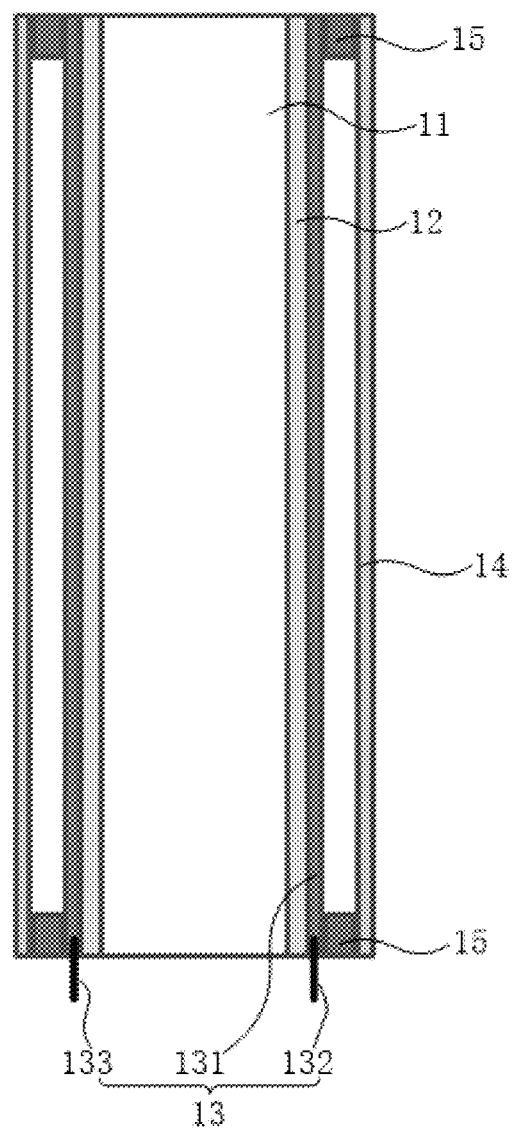
FIG. 6 is a schematic view of a heater with a resistive heating layer coated on an infrared radiation layer according to the first embodiment of the present application.

Referring to FIG. 6, different from the examples shown in FIG. 3 to FIG. 5, the resistive heating layer 131 includes a continuous conductive film covering the outer surface of the infrared radiation layer 12, that is, the resistive heating layer 131 covers the entire outer surface of the infrared radiation layer 12.

It shall be noted that, it is also feasible that the infrared radiation layer 12 covers part of the outer surface of the base 11 and the resistive heating layer 131 covers part of the surface of the infrared radiation layer 11.

In this example, the resistance value of the resistive heating layer 131 may be 0.5Ω to 3Ω, and the deposited thickness is 0.3 to 3 microns.

Figure 7:
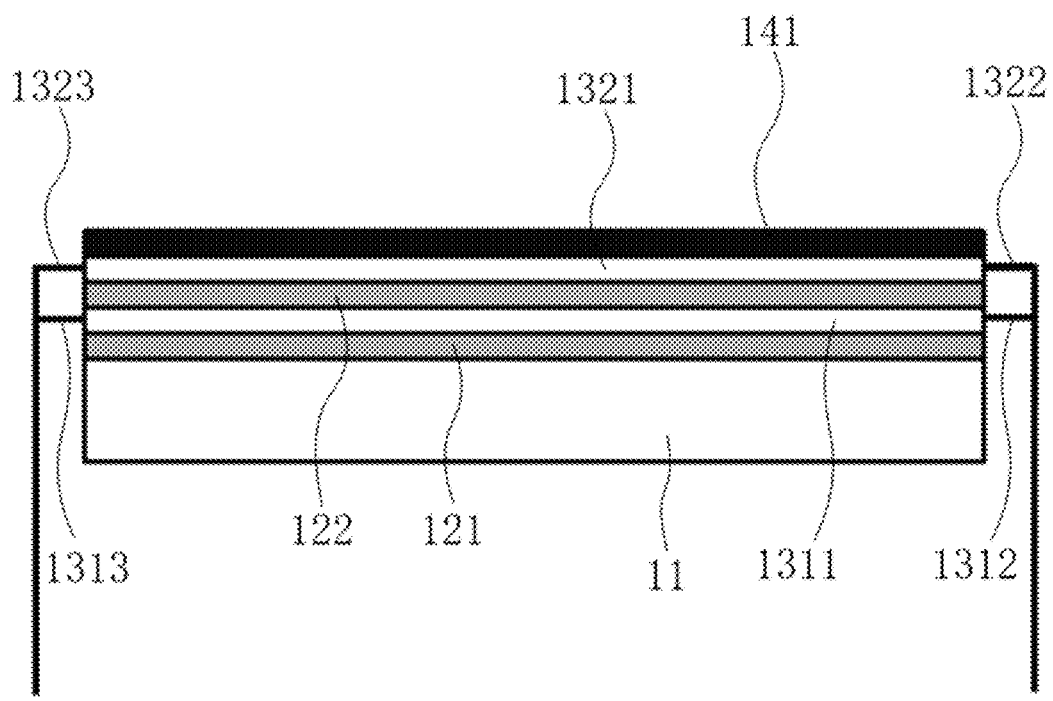
FIG. 7 is a schematic view of a heater with a multilayer structure according to the first embodiment of the present application.

Further referring to FIG. 7, in an example, the infrared radiation layer and the resistive heating layer formed on the base 11 have a multilayer film structure. As shown in the figure, the multilayer film structure includes an infrared radiation layer 121, a resistive heating layer 1311, an infrared radiation layer 122, and a resistive heating layer 1321. Electrodes 1312 and 1313 are electrically connected with the resistive heating layer 1311 respectively, electrodes 1322 and 1323 are electrically connected with the resistive heating layer 1321 respectively, electrodes 1312 and 1322 are connected in parallel, and electrodes 1313 and 1323 are connected in parallel. Meanwhile, the infrared reflecting layer 141 may be directly deposited on the resistive heating layer 1321, or the resistive heating layer 1321 forms the infrared reflecting layer 141.

As illustrated in combination with Examples 1-1, 1-2 and 2-1, the multilayer film structure may be: zirconia/titania composite film+titanium metal film+zirconia/titania composite film+titanium metal film+titanium nitride infrared reflecting film. The overall resistance is 1.2Ω, the infrared emissivity is 96%, and the preheating time of the aerosol-forming matrix may be shortened from 25 seconds to 16 seconds.

Figure 8:
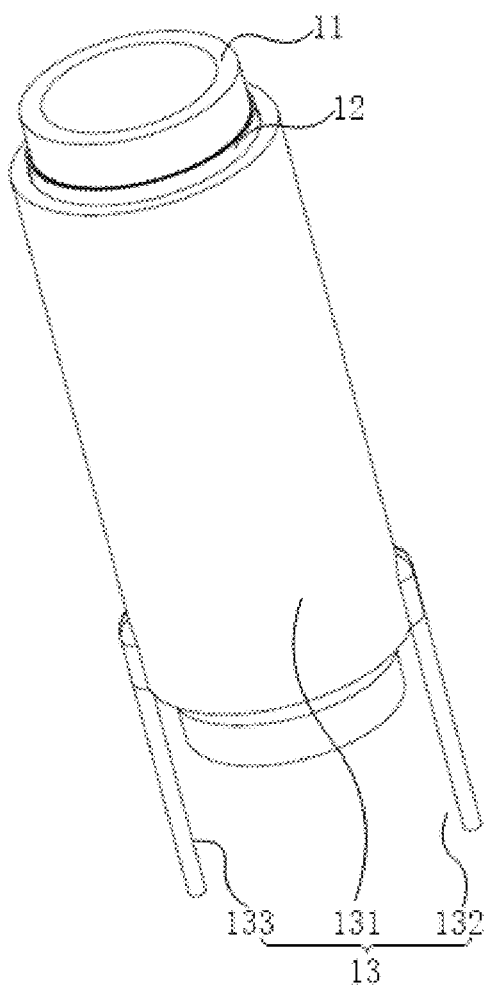
FIG. 8 is a schematic view of a heater with a heating piece according to the first embodiment of the present application.

Referring FIG. 8, in another example, the heating body 13 includes a heating piece 131 separable from the infrared radiation layer 12, and electrodes (132, 133) electrically connected to the heating piece 131. The electrodes (132, 133) are used to feed the electric power of the power supply to the heating piece 131.

In this example, the heating piece includes, but is not limited to, a ceramic heating piece sleeved outside the infrared radiation layer 12, a metal heating piece sleeved outside the infrared radiation layer 12, a heating wire wound around the infrared radiation layer 12, and a flexible printed circuit (FPC) heating film coated outside the infrared radiation layer 12.

Second Embodiment

Figure 9:
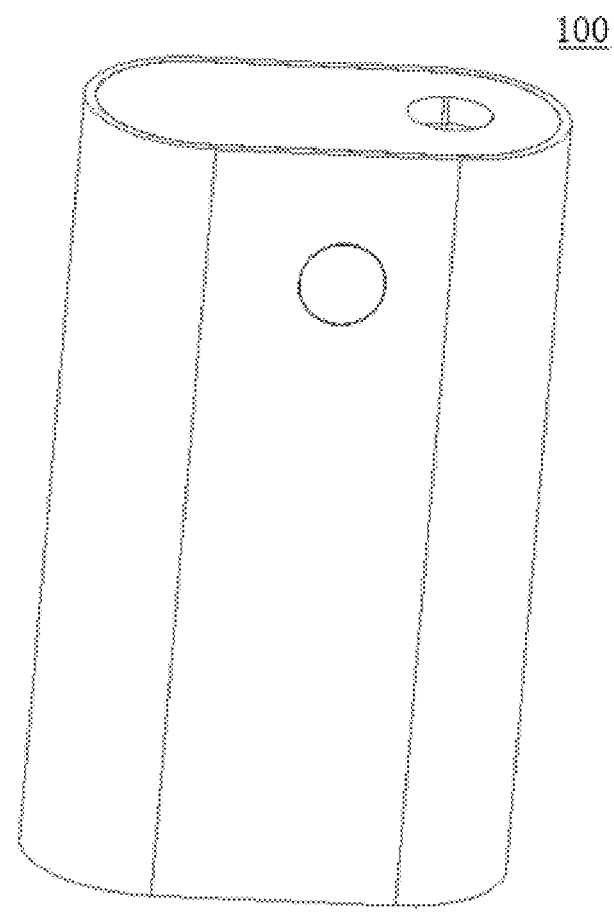
FIG. 9 is a schematic view of a smoking set according to a second embodiment of the present application.
Figure 10:
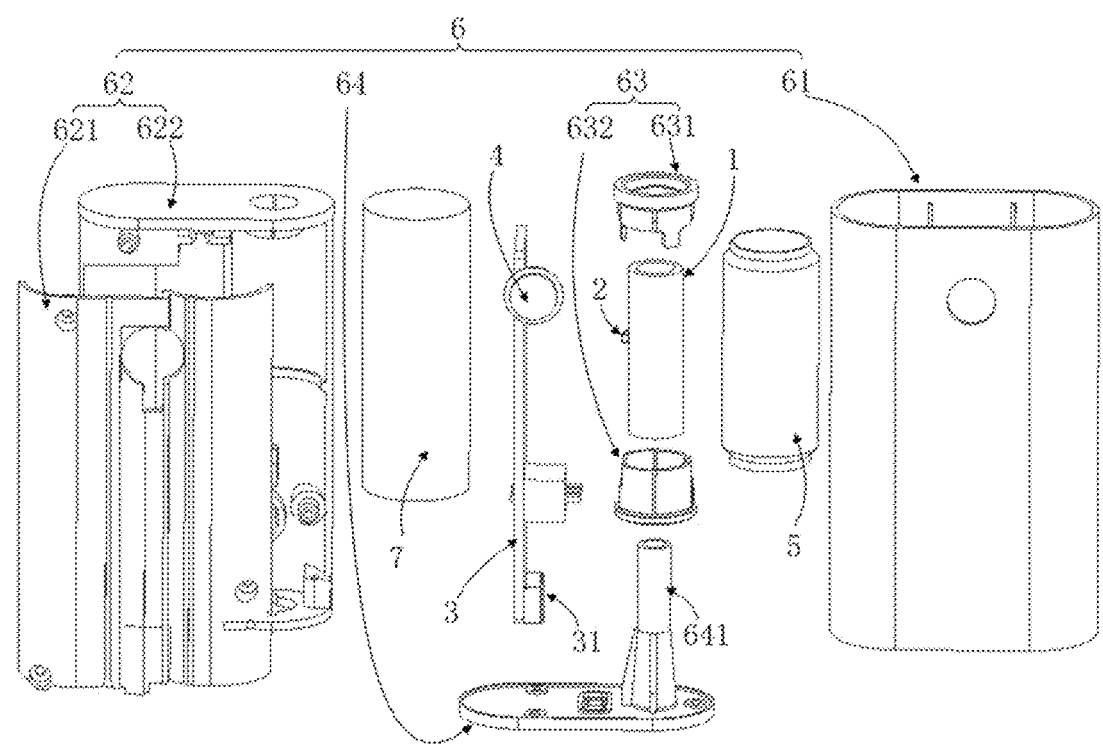
FIG. 10 is an exploded schematic view of the smoking set according to the second embodiment of the present application.

FIG. 9 to FIG. 10 show a smoking set 100 according to the second embodiment of the present application. The smoking set 100 includes a housing assembly 6 and the heater 1 described above. The heater 1 is arranged in the housing assembly 6. The smoking set 100 according to this embodiment includes an infrared radiation layer 12 and a resistive heating layer 131 deposited on the outer surface of the base 11 by a physical vapor deposition method as well as an electrode electrically connected with the resistive heating layer 131. The resistive heating layer 131 receives the electric power of the power supply through the electrode to generate heat, so that the infrared radiation layer 12 is heated up by the heat to generate infrared rays, and the infrared radiation layer 12 performs radiation heating on the aerosol-forming matrix in the cavity of the base 11.

The housing assembly 6 includes an outer shell 61, a fixing housing 62, a fixing member 63 and a bottom cover 64, both the fixing housing 62 and the fixing member 63 are fixed in the outer shell 61, wherein the fixing member 63 is used for fixing the base 11, the fixing member 63 is arranged in the fixing housing 62, and the bottom cover 64 is arranged at one end of the outer shell 61 and covers the outer shell 61. Specifically, the fixing member 63 includes an upper fixing seat 631 and a lower fixing seat 632, both of which are arranged in the fixing housing 62. The first end and the second end of the base 11 are respectively fixed on the upper fixing seat 631 and the lower fixing seat 632, the bottom cover 64 is convexly provided with an air inlet pipe 641, and the end of the lower fixing seat 632 facing away from the upper fixing seat 631 is connected with the air inlet pipe 641. The upper fixing seat 631, the base 1, the lower fixing seat 632 and the air inlet pipe 641 are coaxially arranged, and the base 11 is sealed with the upper fixing seat 631 and the lower fixing seat 632, the lower fixing seat 632 is also sealed with the air inlet pipe 641, and the air inlet pipe 641 is in communication with the outside air so as to facilitate smooth air intake when the user smokes.

The smoking set 100 further includes a main control circuit board 3 and a battery 7. The fixing housing 62 includes a front housing 621 and a rear housing 622, the front housing 621 is fixedly connected with the rear housing 622, the main control circuit board 3 and the battery 7 are both arranged in the fixing housing 62, the battery 7 is electrically connected with the main control circuit board 3, and a key 4 is convexly arranged on the outer shell 61. By pressing the key 4, the infrared radiation layer 12 on the surface of the base 11 may be powered on or powered off. The main control circuit board 3 is further connected with a charging interface 31, and the charging interface 31 is exposed on the bottom cover 64. The user can charge or upgrade the smoking set 100 through the charging interface 31 to ensure the continuous use of the smoking set 100.

The smoking set 100 further includes a heat insulation pipe 5, which is arranged in the fixing housing 62. The heat insulation pipe 5 is sleeved outside the base 11, and it can prevent a large amount of heat from being transferred to the outer shell 61, which otherwise would cause the user to feel hot. The heat insulation pipe includes heat insulation materials, which may be heat insulation glue, aerogel, aerogel felt, asbestos, aluminum silicate, calcium silicate, diatomite, zirconia or the like. The heat insulation pipe may also include a vacuum heat insulation pipe. The heat insulation pipe 5 may further be coated therein with an infrared reflecting coating to reflect the infrared rays emitted by the infrared radiation layer 12 on the base 11 back to the resistive heating layer 131 and improve the heating efficiency.

The smoking set 100 further includes a temperature sensor, such as a NTC temperature sensor 2, for detecting the real-time temperature of the base 11 and transmitting the detected real-time temperature to the main control circuit board 3, and the main control circuit board 3 adjusts the magnitude of the current flowing through the resistive heating layer according to the real-time temperature. Specifically, when it is detected by the NTC temperature sensor 2 that the real-time temperature inside the base 11 is low, for example, when it is detected that the temperature inside the base 11 is lower than 150° C., then the main control circuit board 3 controls the battery 7 to output a higher voltage to the electrode, thereby increasing the current fed into the resistive heating layer, increasing the heating power of the aerosol-forming matrix, and reducing the waiting time for the user to take the first puff. When it is detected by the NTC temperature sensor 2 that the temperature of the base 11 is 150° C. to 200° C., the main control circuit board 3 controls the battery 7 to output a normal voltage to the electrode. When it is detected by the NTC temperature sensor 2 that the temperature of the base 11 is 200° C. to 250° C., the main control circuit board 3 controls the battery 7 to output a lower voltage to the electrode. When it is detected by the NTC temperature sensor 2 that the temperature inside the base 11 is above 250° C., the main control circuit board 3 controls the battery 7 to stop outputting voltage to the electrodes.

It shall be noted that, the specification and attached drawings of the present application show preferred embodiments of the present application. However, the present application may be implemented in many different forms, and it is not limited to the embodiments described in this specification. These embodiments are not construed as additional restrictions on the content of the present application, but are provided for a more thorough and comprehensive understanding of the disclosure of the present application. In addition, the above technical features continue to be combined with each other to form various embodiments not listed above, all of which are regarded as within the scope described in the specification of the present application. Further speaking, those of ordinary skill in the art can make improvements or variations according to the above description, and all these improvements and variations shall fall within the scope claimed in the appended claims of the present application.

What is claimed is:

1. A heater for heating an aerosol-forming matrix and volatilizing at least one component of the aerosol-forming matrix to form aerosol for smoking by users, comprising:
    a base, having an inner surface and an outer surface; the base comprising one or more of quartz glass, sapphire, silicon carbide, magnesium fluoride ceramic, yttrium oxide ceramic, magnesia-alumina spinel ceramic, yttrium aluminum garnet single crystal and germanium single crystal;
    an infrared radiation layer, disposed on the outer surface of the base; and
    a heating body, arranged at a periphery of the base; the heating body being configured to receive electric power to generate heat, and
    Wherein the infrared radiation layer is located between the heating body and the base, and the infrared radiation layer is configured to receive heat from the heating body, so that the infrared radiation layer is heated up by the heat to generate infrared rays configured to penetrate the base and at least heat the aerosol-forming matrix by radiation.

2. The heater according to claim 1, wherein the heating body comprises a resistive heating layer formed on the periphery of the base, a first electrode connected with the resistive heating layer and a second electrode electrically connected with the resistive heating layer;
    wherein the first electrode and the second electrode are configured to feed the electric power of the power supply to the resistive heating layer.

3. The heater according to claim 2, wherein the infrared radiation layer covers at least a part of the outer surface of the base, and the resistive heating layer covers at least a part of a surface of the infrared radiation layer.

4. The heater according to claim 3, wherein the resistive heating layer is a patterned conductive track.

5. The heater according to claim 4, wherein the patterned conductive track is a spiral resistive heating strip, and the resistive heating strip extends spirally along a longitudinal direction of the base.

6. The heater according to claim 5, wherein the resistive heating strip extends at equal pitches along the longitudinal direction of the base.

7. The heater according to claim 5, wherein the resistive heating strip extends at varying pitches along the longitudinal direction of the base to distribute the heat supplied to the infrared radiation layer.

8. The heater according to claim 7, wherein an outer surface of the infrared radiation layer has at least a first area and a second area; and
    a pitch of the resistive heating strip located in the first area is larger than the pitch of the resistive heating strip located in the second area.

9. The heater according to claim 8, wherein the first area is located upstream of the second area in a moving direction of the aerosol.

10. The heater according to claim 3, wherein the resistive heating layer comprises a continuous conductive film coated on an outer surface of the infrared radiation layer.

11. The heater according to claim 2, wherein the heating body further comprises a third electrode electrically connected with the resistive heating layer;
    wherein the third electrode is arranged to divide the resistive heating layer into a first part of the resistive heating layer and a second part of the resistive heating layer along a longitudinal direction of the base, and
    the electric power fed to the first part of the resistive heating layer and/or the second part of the resistive heating layer is independently controlled to heat different positions of the base such that segmented heating of the aerosol-forming matrix is realized.

12. The heater according to claim 11, wherein a length of the first part of the resistive heating layer along the longitudinal direction of the base is greater than a length of the second part of the resistive heating layer along the longitudinal direction of the base.

13. The heater according to claim 12, wherein the first part of the resistive heating layer is located upstream of the second part of the resistive heating layer in a moving direction of the aerosol.

14. The heater according to claim 2, wherein the resistive heating layer is deposited on the infrared radiation layer by a physical vapor deposition method.

15. The heater according to claim 2, wherein the heater further comprises an infrared reflecting layer formed by the resistive heating layer.

16. The heater according to claim 2, wherein the heater further comprises an infrared reflecting layer being flexible, wherein a metal material is deposited on a flexible substrate by a physical vapor deposition method, and the flexible substrate is coated on a periphery of the resistive heating layer to reflect the infrared rays radiated to an outside of a base back to the resistive heating layer.

17. The heater according to claim 16, wherein the heater further comprises a separator, which is arranged between the flexible substrate and the resistive heating layer to form a gap between the infrared reflecting layer and the resistive heating layer, so as to reduce heat loss in a direction away from the aerosol-forming matrix.

18. The heater according to claim 1, wherein the heating body comprises a heating piece separable from the infrared radiation layer and an electrode electrically connected with the heating piece;
    wherein the electrode is configured to feed the electric power of the power supply to the heating piece.

19. A smoking set comprising:
    a housing assembly; and
    a heater arranged in the housing assembly;
    wherein the heater comprises:

a base, having an inner surface and an outer surface; the base comprising one or more of quartz glass, sapphire, silicon carbide, magnesium fluoride ceramic, yttrium oxide ceramic, magnesia-alumina spinel ceramic, yttrium aluminum garnet single crystal and germanium single crystal;

an infrared radiation layer, disposed on the outer surface of the base; and a heating body, arranged at a periphery of the base, and being configured to receive electric power to generate heat, and wherein the infrared radiation layer is located between the heating body and the base, and the infrared radiation layer is configured to receive heat from the heating body, so that the infrared radiation layer is heated up by the heat to generate infrared rays configured to penetrate the base and at least heat the aerosol-forming matrix by radiation.

20. The heater according to claim 1, wherein the heating body is in direct contact with the infrared radiation layer.

* * * * *